(12) United States Patent
Lu et al.

(10) Patent No.: US 9,088,922 B2
(45) Date of Patent: Jul. 21, 2015

(54) METHOD AND APPARATUS FOR MOBILE RELAY HANDOVER

(75) Inventors: Qianxi Lu, Beijing (CN); Rui Fan, Beijing (CN); Gunnar Mildh, Sollentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 626 days.

(21) Appl. No.: 13/393,701

(22) PCT Filed: Jan. 24, 2012

(86) PCT No.: PCT/SE2012/050062
§ 371 (c)(1),
(2), (4) Date: Mar. 1, 2012

(87) PCT Pub. No.: WO2013/055277
PCT Pub. Date: Apr. 18, 2013

(65) Prior Publication Data
US 2013/0089022 A1     Apr. 11, 2013

Related U.S. Application Data

(60) Provisional application No. 61/545,503, filed on Oct. 10, 2011.

(51) Int. Cl.
| | |
|---|---|
| H04W 36/16 | (2009.01) |
| H04W 36/08 | (2009.01) |
| H04W 36/00 | (2009.01) |
| H04W 84/00 | (2009.01) |
| H04W 84/04 | (2009.01) |

(52) U.S. Cl.
CPC .............. *H04W 36/08* (2013.01); *H04W 36/00* (2013.01); *H04W 84/005* (2013.01); *H04W 84/047* (2013.01)

(58) Field of Classification Search
CPC ..... H04W 40/22; H04W 40/36; H04W 36/00; H04W 36/08; H04W 84/047; H04W 84/005
USPC ........................................................ 370/315
See application file for complete search history.

(56) References Cited

U.S. PATENT DOCUMENTS

| | | | |
|---|---|---|---|
| 2005/0094608 A1 | 5/2005 | Yokota | |
| 2010/0260096 A1 | 10/2010 | Ulupinar et al. | |
| 2010/0322197 A1 | 12/2010 | Adjakple et al. | |
| 2012/0082084 A1* | 4/2012 | Balakrishnan et al. | 370/315 |
| 2014/0086138 A1* | 3/2014 | Teyeb et al. | 370/315 |

FOREIGN PATENT DOCUMENTS

WO     2011/020432 A1     2/2011

OTHER PUBLICATIONS

3rd Generation Partnership Project. 3GPP TR 36.806, V9.0.0 (Mar. 2010). 3rd Generation Partnership Project; Technical Specification Group Radio Access Network; Evolved Universal Terrestrial Radio Access (E-UTRA); Relay architectures for E-UTRA (LTE-Advanced) (Release 9). Mar. 2010.

Teyeb, Oumer et al, "Handover Framework for Relay Enhanced LTE Networks," Communications Workshops, 2009. ICC Workshops 2009. IEEE International Conference ON, Jun. 14, 2009, pp. 1-5, XP031515443, IEEE, Piscataway, New Jersey, United States.

3rd Generation Partnership Project. 3GPP TS 36.300, V10.5.0. 3rd Generation Partnership Project; Technical Specification Group Radio Access Network; Evolved Universal Terrestrial Radio (E-UTRA), and Evolved Universal Terrestrial Radio Access Network (E-UTRAN). (Release 10). Sep. 28, 2011, Sophia Antipolis, Valbonne, France.

* cited by examiner

*Primary Examiner* — Mark Rinehart
*Assistant Examiner* — Gbemileke Onamuti
(74) *Attorney, Agent, or Firm* — Murphy, Bilak & Homiller, PLLC

(57) ABSTRACT

The present invention comprises an apparatus and method supporting handover of mobile relay nodes, "RNs" (56), in a wireless communication network (60), in a manner that advantageously differentiates handling of control- and user-plane connections of the wireless communication devices (58) supported by the RN (56). Rather than conventionally anchoring the control-plane connections of relay-connected UEs (58) at the donor radio base station (54-1) supporting the RN (56), the donor radio base station (54-1) includes or is communicatively linked to an anchor node (100) that, from the perspective of the involved control plane entity or entities (70) in a supporting Core Network, "CN" (68), anchors those connections. The anchor node (100) facilitates handover between donor radio base stations (54-1, 54-2) such that the control-plane connections are retained at the anchor node (100) while the user-plane connections are switched to the target radio base station (54-2) receiving the RN (56) in handover.

22 Claims, 10 Drawing Sheets

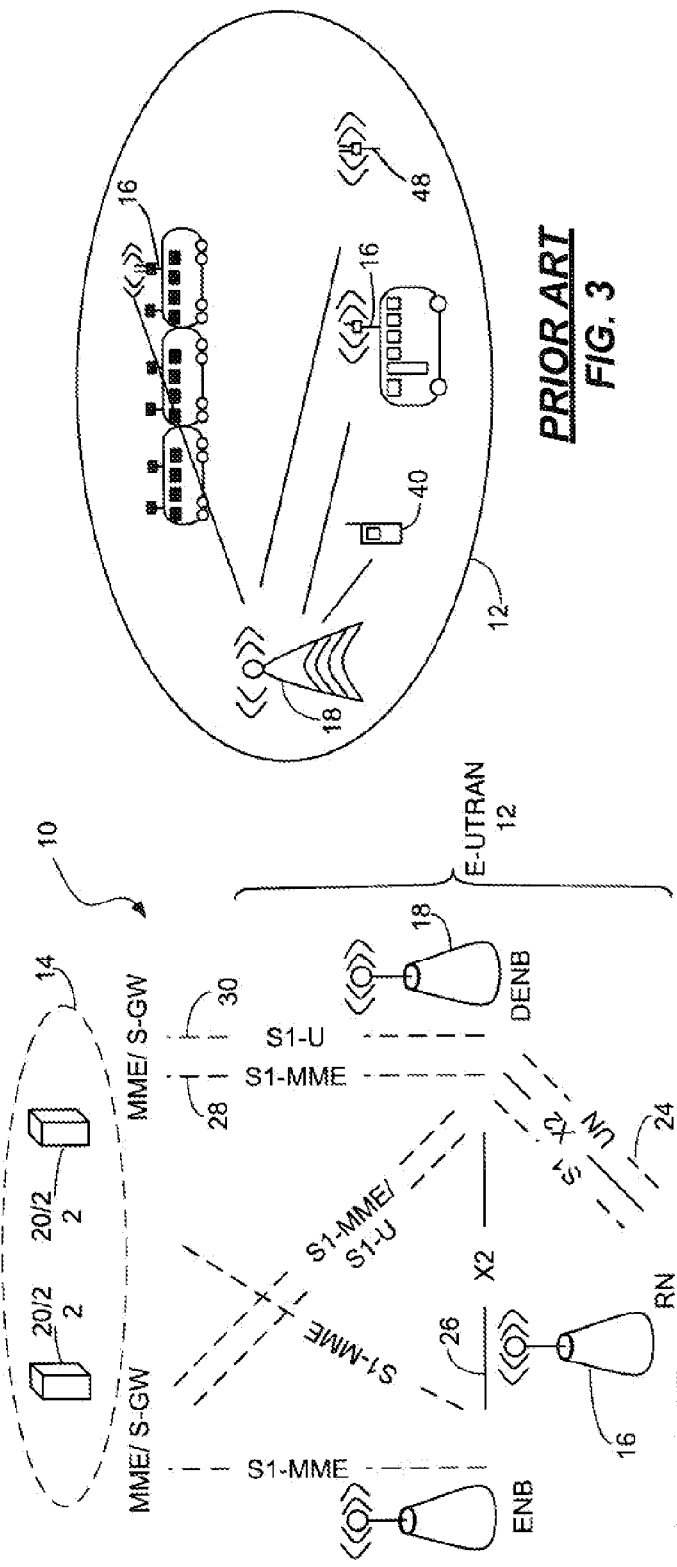
PRIOR ART
FIG. 1
PRIOR ART
FIG. 3
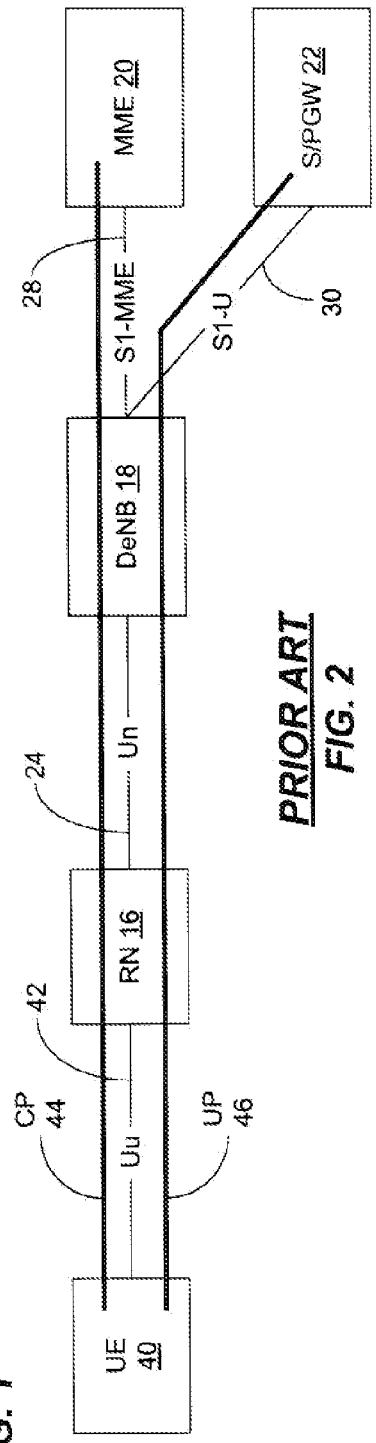
PRIOR ART
FIG. 2

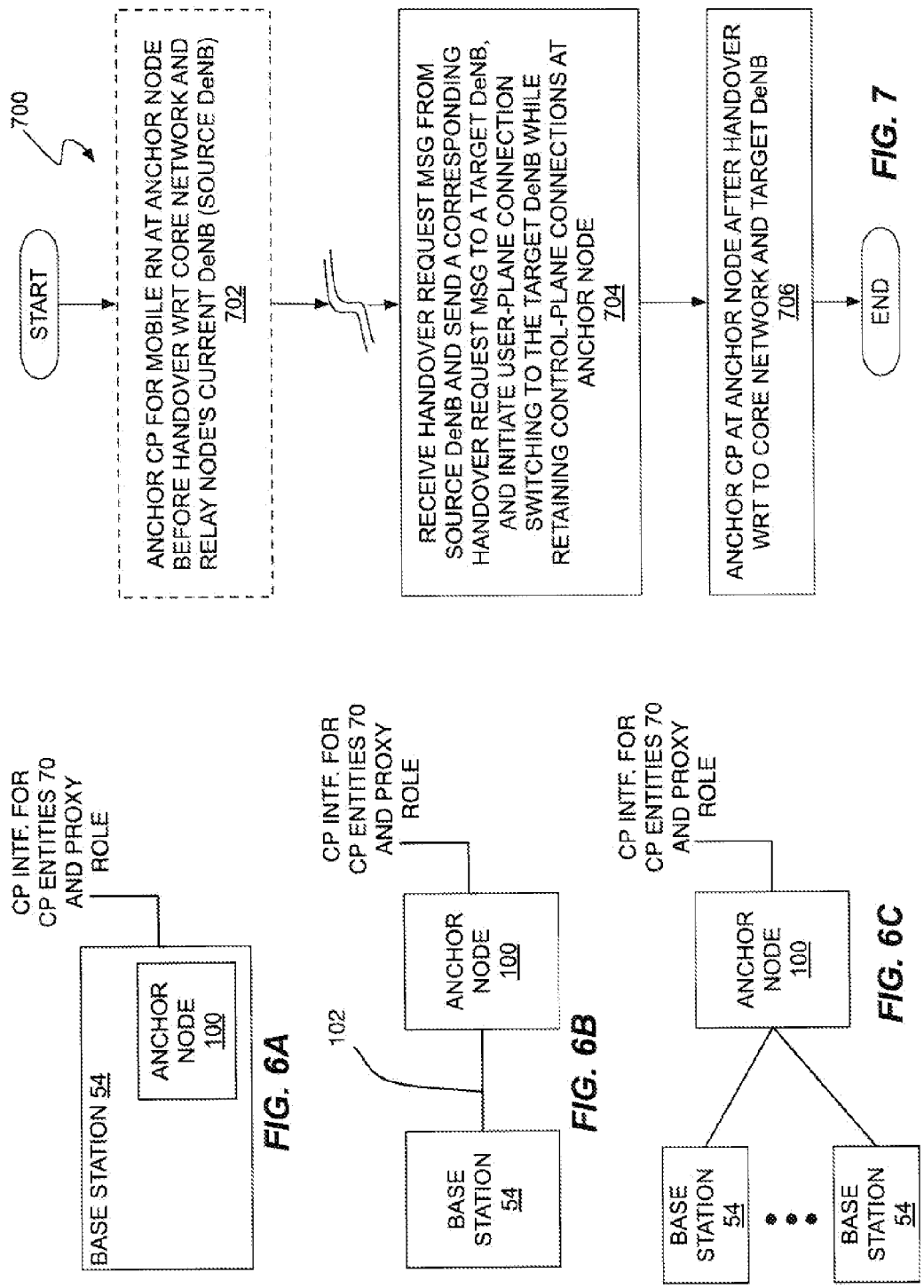

METHOD AND APPARATUS FOR MOBILE RELAY HANDOVER

TECHNICAL FIELD

The present invention generally relates to wireless communication networks and particularly relates to handover of mobile relays in such networks.

BACKGROUND

Release 10 of Long Term Evolution, "LTE", by the Third Generation Partnership Project, "3GPP", introduces relaying as a new feature offering a number of advantages. These advantages include improved coverage for high data rates, rapid temporary network deployment, cell-edge throughput improvements, and/or extension of coverage into new areas. Correspondingly, the 3GPP architecture defines a new node type, referred to as a "Relay Node" or "RN".

As specified in Release 10, a RN cell appears to user equipment, "UEs", as a separate cell distinct from the network cell that supports the RN cell. The supporting network cell is referred to as a "donor" cell and the eNB—also known as an eNodeB—of the donor cell is referred to as a donor eNB or DeNB. Each RN cell has its own Physical Cell Id., "PCI", as defined in LTE Rel-8 and transmits its own synchronization channels, reference symbols, etc. Thus, a UE supported by an RN cell receives scheduling information and HARQ (Hybrid Automatic Repeat-reQuest) feedback and other control signaling directly from the RN. Correspondingly, the UE sends its control channel signaling to the RN. From the perspective of the UE, there is no difference in being served from an RN cell as compared to service from a "standard" eNB cell.

The RN connects to a donor eNB via a wireless interface referred to as the "Un" interface—see 3GPP TS 36.300. In turn, the DeNB provides backhaul transport for the RN and all the UEs connected to the RN. The signaling and the radio protocols used on the Un interface are based on the LTE Rel-8 standard, with only small additions and modifications. Section 4.7 in 3GPP TS 36.300 provides an overview of this approach to relay support.

For further explication, FIG. 1 illustrates a known architecture for an LTE-based wireless communication network 10 that includes a radio access network, "RAN", 12. In the LTE context, the RAN 12 is referred to as an Evolved Universal Terrestrial Radio Access Network or E-UTRAN. The network 10 also includes an associated core network (CN) 14 that may be referred to as an "EPC" or Evolved Packet Core.

The RAN 12 includes or otherwise supports a RN 16, and multiple eNBs 18. At any given time, one of the eNBs 18 acts as a DeNB with respect to the RN 16 and the CN 14 includes a Mobility Management Entity (MME) 20 and a Serving Gateway (S-GW) 22, among other entities, for supporting control- and user-plane connections, respectively, to the UEs connected through the RAN 12. Note that for simplicity no UEs are shown in FIG. 1.

Various defined interfaces interconnect the illustrated entities, including a Un interface 24 coupling the RN 16 to the DeNB 18, an X2 interface 26 interconnecting the eNBs 18, an S1-MME interface 28 between the eNBs 18 and the MME 20 for control-plane signaling, and an S1-U interface 30 between the eNBs 18 and the S-GW 22 for user-plane signaling. The RN 16 terminates the S1/X2 interfaces 28, 26 in the same way as a normal eNB 18. However, the S1-MME interface 28 is not directly connected to the MME/S-GW 20/22 as for normal eNBs. Instead, for the RN 16, the S1 control messages and data are forwarded between the RN 16 and the S1-MME/U interfaces 28 and 30 associated with the DeNB 18.

FIG. 2 provides further illustration of these known interface connections, and in particular illustrates a UE 40 connected to the RN 16 through a "Uu" interface 42. There is a control-plane, "CP", connection 44 between the UE 40 and the MME 20. Likewise, the UE 40 has a user-plane, "UP", connection 46 with the S-GW 22. There is a Generalized Tunneling Protocol ("GTP") tunnel associated with each UE EPS bearer, spanning from the S-GW 22 associated with the UE 40 to the DeNB 18, which is switched to another GTP tunnel in the DeNB 18, going from the DeNB 18 to the RN 16, according to a one-to-one mapping.

Similarly, the X2 user-plane protocol stacks for supporting the RN 16 during inter-eNB handover from a source DeNB 18 to a target DeNB 18 are proxied via the source DeNB. In particular, there is a GTP forwarding tunnel associated with each UE EPS bearer subject to forwarding, spanning from the source eNB 18 to the target DeNB 18. Such forwarding tunnels are switched to corresponding GTP tunnels in the target DeNB 18, going from the target DeNB 18 to the RN 16, according to a one-to-one mapping. In turn, the user-plane packets are mapped to radio bearers over the Un interface 24. The mapping can be based on the QCI associated with the UE EPS bearer, and UE EPS bearers with similar QoS can be mapped to the same Un radio bearer.

It is challenging to provide high throughput and short handover interruption time for UEs 40 in scenarios where several UEs 40 travel together at high speed. Such group mobility scenarios arise, for example, on trains, buses, and airplanes, where potentially large groups of UEs are moving together and being supported by a mobile RN 16 that is located on the moving vehicle. The likelihood of handover failure increases in such scenarios, because potentially many, nearly simultaneous, handover requests must be signaled for the UEs 40 that are supported by the mobile RN 16.

As shown in FIG. 3, mobile RNs 16 may be installed on top of trains and buses and UEs 40 inside the moving vehicles are connected to these RNs 16 instead of being connected to externally installed eNBs 18 or fixed RNs 48. For example, the diagram depicts an eNB 18 within the RAN 12, where that eNB 18 supports mobile RNs 16 mounted on a bus and a train, respectively. It will be understood that the bus and train move through the cell coverage area of the eNB 18. One also sees that the cell may include one or more static RNs 48, such as might be used to improve cell coverage and/or to provide localized, higher data rate service.

Further, the diagram illustrates an example UE 40, which is supported directly by the eNB 18. However, it will be understood that each mobile RN 16 and/or static RN 18 may support multiple UEs 40, although such UEs 40 are not explicitly shown in the diagram. From the perspective of a UE 40 connected to one of the mobile RNs 16, the serving cell of the UE 40 remains the same, despite the RN 16 moving through multiple cells within the network 10. That is, the RN 16 is handed over from eNB cell to eNB cell in the RAN 12. That is, a mobile RN 16 is handed over from one DeNB 18 to the next as it moves through cells of the network 10, while the UEs 40 moving with the RN 16 remain connected to the RN 16.

Of course, handover of the RN 16 must be properly handled. WO 2011/020432 discloses two example approaches for mobile relay handover. However, these known approaches do not reconcile the potential difficulties associated with relocating the RN 16 and its supported UEs 40 from a packet routing sense, with respect to the rest of the network 10, along with minimizing the required handover signaling and any post-handover signaling burdens imposed on the source DeNB 18.

SUMMARY

The present invention comprises an apparatus and method supporting handover of a mobile relay node, "RN", in a wireless communication network in a manner that advantageously differentiates handling of control- and user-plane connections of the wireless communication devices supported by the RN. Rather than conventionally anchoring the control-plane connections of relay-connected UEs at the donor radio base station supporting the RN, the donor radio base station includes or is communicatively linked to an anchor node that anchors those connections from the perspective of the involved control plane entity or entities in a supporting Core Network, "CN". The anchor node supports handover between source and target radio base stations such that the control-plane connections are retained at the anchor node while the user-plane connections are switched to the target radio base station. Among the several advantages provided by this modified handover, retaining the control-plane connections at the anchor node minimizes handover signaling overhead, particularly in the air interface, and shortens the handover process, while still moving the user-plane data traffic to the target radio base station.

In one embodiment, the anchor node comprises one or more processing circuits that are configured to anchor a control-plane connection of a relay-connected UE before the handover, with respect to a control plane entity that supports the relay-connected UE. Further, the processing circuits of the anchor node are configured to act as a proxy for the control plane entity towards the source radio base station, for control-plane signaling involving the relay-connected UE. Of course, it will be understood that the anchor node provides such functionality for any number of relay-connected UEs, and any number of corresponding, supporting control plane entities in the associated CN.

The anchor node further includes one or more communication interfaces that are configured to receive a handover request message from the source radio base station and send a corresponding handover request message to the target radio base station. The corresponding handover request message identifies the anchor node rather than the actual control plane entity as the supporting control plane entity of the relay-connected UE. Again, such functionality is provided by the anchor node for any number of relay-connected UEs involved in the handover, with respect to any number of supporting control plane entities in the associated CN.

Still further, the processing circuits of the anchor node are configured to initiate switching of a user-plane connection of the relay-connected UE from the source radio base station to the target radio base station, while retaining the control-plane connection of the relay-connected UE at the anchor node. Advantageously, then, the anchor node is configured to anchor the control-plane connection of the relay-connected UE after the handover, with respect to the control plane entity and to act as a proxy for the control plane entity towards the target radio base station, for control-plane signaling involving the relay-connected UE.

The anchor node in at least one embodiment implements processing—operations and associated signaling—supporting an initial attachment procedure for mobile RNs, whereby at least in the control-plane sense mobile RNs attach to the wireless communication network through the anchor node. For example, UE context setup and other signaling flows through the anchor node such that, after connection, the RN looks like a cell under the anchor node. In this configuration, the anchor node operates as a control-plane proxy towards the donor radio base station through which the RN attached to the network. In this proxy role, the anchor node uses standard control-plane signaling protocols and the proxy operation is thus transparent to the donor radio base station. Moreover, the control plane entities in the CN that are supporting the relay-connected UEs "see" the anchor node's anchoring of UE control-plane connections as they would see such anchoring performed by a conventional radio base station.

Consequently, the anchor node retains its anchoring of those control-plane connections—and any new connections that are added as new UEs attach through the RN—over any number of handovers of the RN from one donor radio base station to another. At any given time, the anchor node operates as a proxy for the involved control plane entities towards the donor radio base station to which the RN is currently attached.

In another embodiment contemplated herein, a method of supporting handover of a mobile RN from a source radio base station to a target radio base station comprises anchoring a control-plane connection of a relay-connected UE before the handover with respect to a control plane entity that supports the relay-connected UE and acting as a proxy for the control plane entity towards the source radio base station, for control-plane signaling involving the relay-connected UE. The method further includes receiving a handover request message from the source radio base station and sending a corresponding handover request message to the target radio base station. The corresponding handover request message identifies the anchor node rather than the control plane entity as the supporting control plane entity of the relay-connected UE.

The method additionally includes initiating switching of a user-plane connection of the relay-connected UE from the source radio base station to the target radio base station, while retaining the control-plane connection of the relay-connected UE at the anchor node. To accomplish such retention, the method includes anchoring the control-plane connection of the relay-connected UE after the handover with respect to the control plane entity and also acting as a proxy for the control plane entity towards the target radio base station, for control-plane signaling involving the relay-connected UE.

Advantageously, then, from the perspective of the control plane entities supporting the relay-connected UEs, the point in the Radio Access Network (RAN) at which the associated control-plane connections are anchored remains unchanged when the RN is handed over from one radio base station to another. In other words, from the perspective of the actual control plane entity in the CN that supports the control plane of a relay-connected UE, the control-plane connection of that UE is anchored at the anchor node before handover, and remains anchored at the anchor node after handover. Similarly, before handover, the anchor node operates as a proxy for the supporting control plane entity towards the source radio base station, and after handover operates as a proxy for the supporting control plane entity towards the target radio base station.

In an example specific to Long Term Evolution (LTE) based networks, the source radio base station is a source donor eNB, referred to as the source DeNB, and the target radio base station is another DeNB, referred to as the target DeNB. According to the present invention, the source DeNB supports a mobile RN, which in turn supports one or more UEs, referred to as relay-connected UEs. A handover decision is taken, in which the RN will be handed over from the source DeNB to the target DeNB, and an anchor node included with or communicatively coupled to the source DeNB advantageously supports a modified handover, in which the anchor node retains the control-plane connections of the relay-connected UEs and acts a proxy for the control plane entity or entities supporting those relay-connected UEs. The anchor node plays this proxy role towards the source radio base station before handover and towards the target radio base station after handover.

As such, handover as supported by the contemplated anchor node keeps the control planes of the relay-connected UEs at the anchor node, which acts as an S1/X2 proxy for the source DeNB before handover and for the target DeNB after handover, for control-plane signaling involving the relay-connected UEs. However, the handover advantageously switches the user planes of the relay-connected UEs to the target DeNB, so that user-plane signaling involving those relay-connected UEs goes directly between the supporting Serving Gateway(s), "S-GWs", in the CN and the target DeNB, rather than remaining connected at the source DeNB or the anchor node. In particular, the modified handover switches the S1-U connections for the relay-connected UEs from the source DeNB to the target DeNB.

The present invention thus avoids the problems associated with Packet GW relocation by leaving the control-plane connections of the relay-connected UEs anchored at the anchor node despite handover of the RN, yet optimizes the user-plane connection paths of the relay-connected UEs by avoiding the need to route user-plane signaling through the source DeNB and/or the anchor node. The continued routing of control-plane signaling for the relay-connected UEs through the anchor node imposes a minimal burden on the network at large because the volume of control-plane signaling is small compared to that of user-plane data traffic.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of a known LTE network.

FIG. 2 is a diagram of protocol and interface connections used in the LTE network of FIG. 1.

FIG. 3 is a block diagram of known mobility scenarios for relay nodes.

FIGS. 6A-6C are block diagrams of example embodiments for implementation of the anchor node contemplated herein.

FIG. 7 is a logic flow diagram of a processing method implemented, for example, by a radio base station as shown in FIG. 5.

DETAILED DESCRIPTION

Figure 4:
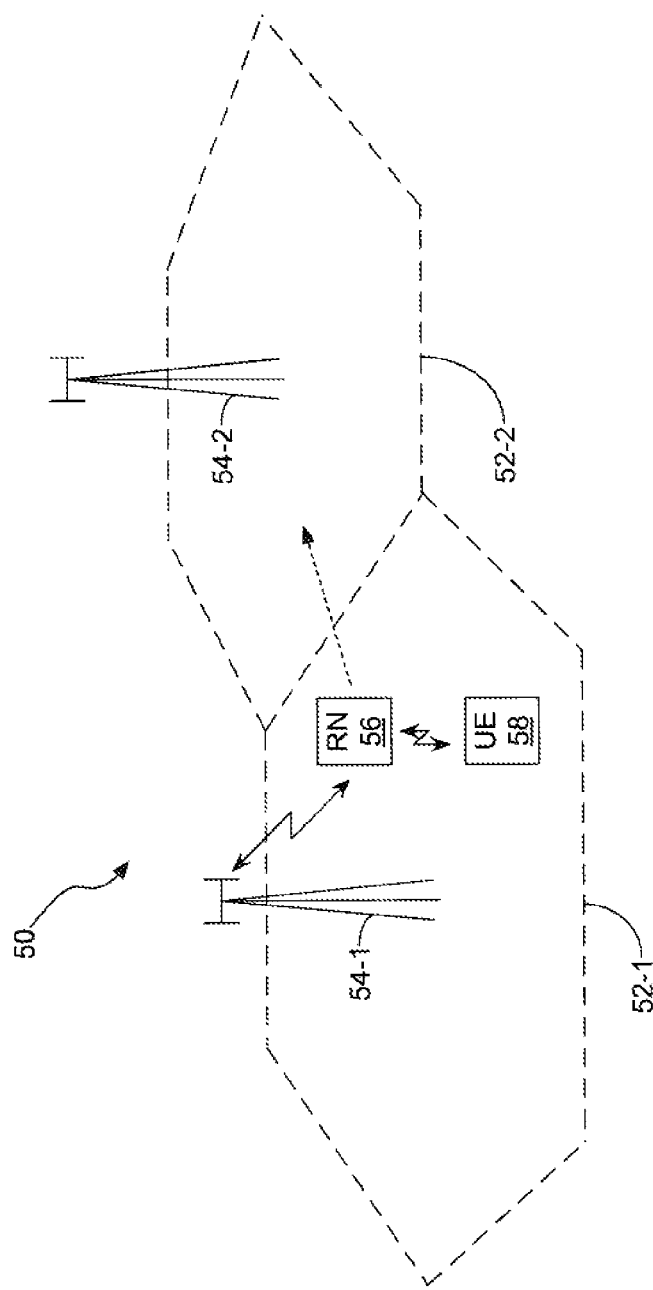
FIG. 4 is a block diagram of a radio access network portion of a wireless communication network, according to an embodiment of the present invention.

FIG. 4 illustrates one embodiment of a Radio Access Network, "RAN", 50, according to one embodiment. The RAN 50 will be understood as comprising part of a wireless communication network that includes potentially many cooperating nodes, and it will be further understood that the RAN 50 may be implemented according to a desired network standard. For example, in one embodiment, the RAN 50 comprises an LTE-based RAN.

The RAN 50 includes potentially many cells 52, but only two cells 52-1 and 52-2 are shown for simplicity. Each cell 52 is associated with a corresponding radio base station 54, e.g., the radio base station 54-1 provides or otherwise defines the cell 52-1 and the radio base station 54-2 provides or otherwise defines the cell 54-2. Each cell 52 will be understood as the "intersection" of a given geographic area and given radio network resources allocated for providing radio service in that area. As a non-limiting example, each cell 52 is defined by a given radio carrier frequency providing service coverage over a given area.

FIG. 4 also depicts a mobile relay node, "RN", 56 that is positioned within the cell 52-1 but moving towards the boundary with the cell 52-2. One may assume that the RN 56 is currently served by the radio base station 54-1 of the cell 52-1, but its movement toward the other cell 52-2 will at some point trigger handover of the RN 56 from the radio base station 54-1 to the radio base station 54-2. In the context of that handover, the radio base station 54-1 is the "source" radio base station and the radio base station 54-2 is the "target" radio base station. In an LTE-based example, the radio base station 54-1 would be referred to as the source DeNB and the radio base station 54-2 would be referred to as the target DeNB.

The RN 56 may support a plurality of wireless communication devices and from the perspectives of those devices the RN 56 looks like a radio base station, despite the RN being mobile. In this disclosure, the term User Equipment or "UE" is used in the generic sense, to refer to the range of wireless communication device types that can be used for connecting with the RAN 50 through a radio base station 54 or an RN 56. Such UEs includes feature phones, smart phones and other cellular communication handsets, as well as wireless network adaptors, cards, dongles, etc., and also includes machine-to-machine, "M2M", modems and other such embedded communication transceivers or modules.

In this regard, those of ordinary skill in the art will recognize that the present invention is not limited to the particular type of device that is connected through the RN 56. For simplicity, the diagram depicts a single UE 58 that is connected through the RN 56 and is therefore referred to as a relay-connected UE 58.

Figure 5:
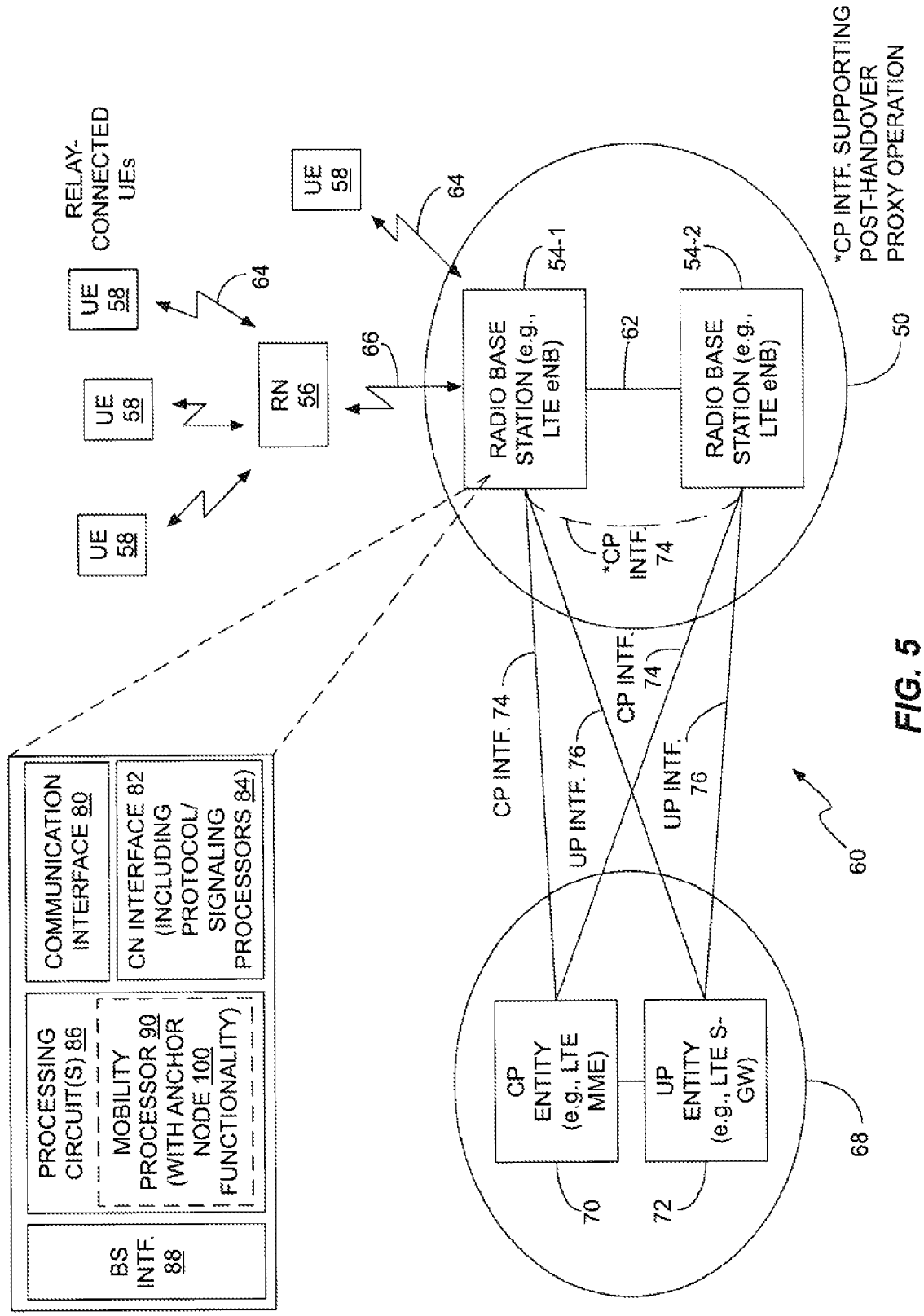
FIG. 5 is a block diagram of example details for one or more of the radio base stations introduced in FIG. 4, shown in context with certain core network entities.

FIG. 5 builds on FIG. 4 by illustrating details for the RAN 50 and by adding further details relevant to the larger wireless communication network 60 with which the RAN 50 is associated. One sees the two radio base stations 54-1 and 54-2 interconnected by an inter-base station communication interface 62. In an LTE-based example, the interface 62 is an "X2" interface.

FIG. 5 illustrates one UE 58 having a radio connection 64 directly with the radio base station 54-1, and further illustrates the RN 56 having a radio connection 66 to the radio base station 54-1. In turn, a number of UEs 58 have radio connections 64 to the RN 56. Consequently, in the context of FIG. 5, these multiple UEs 58 are relay-connected UEs 58. In an LTE-based example, the connections 64 may be understood as representing the Uu interface 42 shown in FIG. 2, and the connection 66 between the RN 56 and the radio base station 54-1 may be understood as representing the Un interface 24.

FIG. 5 also depicts a Core Network, "CN", 68, which in an LTE-based example would be referred to as an "Evolved Packet Core" or EPC. The CN 68 includes a potentially large number of entities, but for simplicity the diagram only illustrates a control-plane, "CP", entity 70 and a user-plane, "UP", entity 72. There may be multiple instances of such entities in an actual embodiment of the CN 68.

In an LTE-based example, the control-plane entity 70 comprises a Mobility Management Entity, "MME", and the user-plane entity 72 comprises a Serving Gateway, "S-GW". A given UE 58 would have an S1-MME connection to the MME for control-plane signaling, and an S1-U connection to the S-GW for user-plane communications. More generally, each relay-connected UE 58 has a control-plane connection to a supporting control-plane entity 70 in the CN 68, and a user-plane connection to a supporting user-plane entity 72 in the CN 68. A control-plane interface 74 supports such control-plane connections, and a user-plane interface 76 supports such user-plane connections.

The illustrated example contemplates handover of the RN 56 from the radio base station 54-1 to the radio base station 54-2. Thus, the radio base station 54-1 plays the role of "source" and the radio base station 54-2 plays the role of "target". It will be understood that the roles may be reversed, e.g., later for the same RN 56 and/or for another RN 56. In any case, with the illustrated scenario in mind, the source radio base station 54-1 includes a wireless communication interface 80 for communicating with UEs 58 and with RNs 56 that are served by the source radio base station 54-1. The wireless communication interface 80 comprises, for example, radio transceivers for transmitting and receiving wireless communication signals, and associated protocol processors, configured according to the air interface standard(s) involved. In an LTE example, the communication interface 80 supports the Uu and Un interfaces.

The source radio base station 54-1 further includes a CN communication interface 82 that includes, for example, configured protocol/signaling processors 84. The CN communication interface 82 supports the control-plane signaling interface 74 to control-plane entities 70 in the associated CN 68, and supports the user-plane signaling interface 76 to user-plane entities 72 in the core network 68. Additionally, the source radio base station 54-1 includes one or more processing circuits 86 that are operatively associated with the wireless communication and core network communication interfaces 80 and 82, and with an inter-base station interface 88.

The processing circuits 86 include a mobility processor circuit 90, which may comprise one or more functional circuits in the source radio base station 54-1. The mobility processor circuit 90 is configured to perform a number of operations associated with mobile relay handover. In an example embodiment, the mobility processor circuit 90 implements an anchor node 100 that is configured to anchor control- and user-plane connections for a relay-connected UE 58, in advance of a handover of the associated RN 56 from the source radio base station 54-1 to the target radio base station 54-2. These connections will be understood as being associated with corresponding, supporting control-plane and user-plane entities 70 and 72 in the NC 68. Further, the term "anchor" as used here means that the anchor node 100 maintains or otherwise supports the control-plane and user-plane connections associated with the relay-connected UE 58. Equivalently, the user-plane connections may be anchored by a processing circuit in the source radio base station 54-1 other than the anchor node 100.

In any case, assume for this example that the decision is made to handover the RN 56 from the source radio base station 54-1 to the target radio base station 54-2 and that the source radio base station 54-1 generates a handover request message that is sent to the anchor node 100 rather than directly to the target radio base station 54-2. If the anchor node 100 is integrated with the source radio base station 54-1, the anchor node 100 receives the handover request message via internal signaling or a local connection; however, in at least one embodiment, such signaling connections conform to the conventional protocols associated with sending handover request messages, so that the source radio base station 54-1 uses established protocols for sending such a message.

In response to receiving the handover request message from the source radio base station 54-1, the anchor node 100 sends a corresponding handover request message to the target radio base station 54-2. The corresponding handover request message identifies the anchor node 100 as the supporting control plane entity for the relay-connected UEs 58, rather than identifying the actual control plane entity or entities 70 in the CN 68 that are supporting the control planes of the relay-connected UEs 58. Assuming that handover progresses—e.g., that the expected handover request acknowledgement is received from the target radio base station 54-2—the anchor node 100 continues its support of the handover by sending signaling to switch the user-plane connections of the relay-connected UEs 58 from the source radio base station 54-1 to the target radio base station 54-2, while retaining the control-plane connections of those UEs 58.

After handover, the supporting control-plane entities 70 in the CN 68 still "see" the anchor node 100 as the RAN anchor point for the control-plane connections of the relay-connected UEs 58. Correspondingly, the target radio base station 54-2 "sees" the anchor node 100 as the supporting control-plane entity for the relay-connected UEs 58. In this regard, the post-handover proxy operation of the anchor node 100 towards the target radio base station 54-2, for control-plane signaling involving the relay-connected UEs 58 is fully realized in the sense that the anchor node 100 provides a control-plane interface towards the target radio base station 54-2 that operates at the same network layer and with the same interface protocols as would be provided by the actual control-plane entities 70.

See the dashed-line interconnection between the source radio base station 54-1 and the target radio base station 54-2 in FIG. 5, denoting that the anchor node 100 integrated within the source radio base station 54-1 supports a control-plane interface 74 between it and the target radio base station 54-2, so that the target radio base station 54-2 sends/receives control-plane signaling for the relay-connected UE 58 to/from the source radio base station 54-1 using the same interface and signaling protocols that it would use if it communicated directly with the actual supporting control-plane entities 70 in the CN 68.

Of course, it is contemplated herein that anchor node 100 need not be implemented in the mobility processor circuit 90 of the source base station 54-1. Instead, the anchor node 100 may be implemented separately, at least in a functional sense, from the processing circuits comprising the mobility processor circuit 90. Such a configuration allows the mobility processor circuit 90 to support conventional mobility-related processing operations carried out by the source radio base station 54-1, while allowing the differentiated handover and control-plane proxy operations to be implemented in one or more anchor-node functional blocks within the source radio base station 54-1. Going further, the anchor node 100 may be fully separated from the source radio base station 54-1.

FIGS. 6A-6C depict several example embodiments of the anchor node 100 as contemplated herein. FIG. 6A provides a simplified depiction of the implementation introduced in FIG. 5, namely, full integration of the anchor node 100 into the processing circuitry of the source radio base station 54-1. FIG. 6B illustrates a variation on such integration, wherein the anchor node 100 is partially integrated into or at least co-located with the source radio base station 54-1 and communicatively coupled to it via one or more local connections 102. Note that these local connections 102 are, in at least one embodiment, compliant with the control plane signaling protocols associated with communications between the base stations 54 and the control plane entities 70—e.g., S1 MME compliant in LTE-based implementations—so that operation of the anchor node 100 is transparent.

FIG. 6C depicts yet another implementation, wherein the functionality of the anchor node 100 is broken out from any given individual radio base station 54 and implemented in a more centralized fashion, such that one anchor node 100 may provide control plane anchoring for multiple RNs 56 attached through multiple radio base stations 54. That is, a given anchor node 100 as taught herein may be integrated with individual radio base stations 54—where integration includes co-location—or may be implemented in a centralized fashion within the RAN 50 or the CN 68, such that one anchor node 100 commonly "serves" multiple radio base stations 54, i.e., one anchor node 100 provides control-plane anchoring for any number of RNs 56 across any number of radio base stations 54 in the wireless communication network 60.

In general then, the contemplated anchor node 100 is either integrated into an individual radio base station 54, or communicatively linked at least to that individual radio base station 54. When broken out separately from given individual radio base stations 54, the anchor node 100 may be communicatively linked to multiple radio base stations 54. Regardless of the implementation, the anchor node 100 and its associated differentiated (split) handling of control-plane and user-plane connections in the context of mobile relay node handovers readily distinguish from conventional approaches.

For example, in one contrasting conventional approach, control-plane signaling for relay-connected UEs still flows through the source radio base station after handover of an associated mobile relay node to a target radio base station, but that signaling is changed over to an inter-base station interface, for signaling between the source and target radio base stations. In such scenarios, the target radio base station does not see the source radio base station as being the supporting control-plane entity in the involved core network. Instead, the target radio base station uses its inter-base station interface rather than its control-plane interface for sending/receiving control-plane signaling for the relay-connected UEs through the source radio base station, to the supporting control plane entity or entities.

In at least one embodiment, the RAN 50 is an LTE RAN and the source and target radio base stations 54-1 and 54-2 are source and target DeNBs. Correspondingly, the control-plane entity 70 is an MME and the user-plane entity 72 is an S-GW. In this context, the anchor node 100, which may be integrated with the source DeNB, is configured to send a handover request message via X2 Application Protocol, "AP", signaling with the target DeNB. In particular, the anchor node 100 receives a handover request message, e.g., via X2 AP signaling from the source DeNB, and sends a corresponding handover request message to the target DeNB, to initiate handover of the RN 56 from the source DeNB to the target DeNB.

The corresponding handover request message sent to the target DeNB identifies the anchor node 100 as the supporting control plane entity (or entities) for the relay-connected UEs 58, rather than identifying the actual control plane entity (or entities) 70 in the CN 68 that are supporting the control planes of the relay-connected UEs 58. In an example of this operation, assume there is one relay-connected UE 58 whose control plane is supported by a particular MME in the CN 68. As such, from the perspective of that MME, the control plane of the relay-connected UE 58 is connected at/anchored at the anchor node 100, which is in the source radio base station 54-1 or is communicatively coupled to it.

Thus, the control plane connection is uniquely identified by a unique address or other identifier, "ID", at the MME and by a corresponding unique ID at the anchor node 100. The corresponding handover request message sent by the anchor node 100 carries the ID used by the anchor node 100 to identify the UE's control-plane connection, which means that that control-plane connection remains anchored at the anchor node 100 from the perspective of the supporting MME. Further, this inclusion of the anchor node's control-plane connection ID rather than the connection ID maintained by the MME that actually supports the relay-connected UE 58 means that the target base station 54-2 "sees" the anchor node 100 as the supporting control plane entity, rather than looking towards the actual supporting MME.

Accordingly, the anchor node 100 is configured to act as a proxy for the MME with respect to the target DeNB, based on being configured to forward S1-AP signaling received from the target DeNB for the relay-connected UE 58 to the MME, and to forward S1-AP signaling received from the MME for the relay-connected UE 58 to the target DeNB. To perform this proxy operation, the anchor node 100 is configured to update a UE S1-MME Identifier, "ID", in S1-AP signaling received from the target DeNB, for the relay-connected UE 58, to match the address allocated at the MME for the relay-connected UE 58, rather than address allocated at the anchor node 100. This replacement is done to account for the fact that, as part of the handover, the anchor node 100 send the value of the UE S1-MME ID allocated at the anchor node 100 for the relay-connected UE 58, instead of the corresponding address allocated at the MME.

Additionally, in one or more embodiments where tunneling protocols are used for communicating through the RN 56, the anchor node 100 is configured to send a tunneling identifier for the RN 56 to the target radio base station 54-2 in the modified handover request message. For example, the anchor node 100 is configured to send a Tunneling Endpoint Identifier, "TEID", for the RN 56, in accordance with the GPRS Tunneling Protocol, "GTP", as the tunneling identifier included in the modified handover request message.

Further, in one or more embodiments, the anchor node 100 is configured to, as part of completing the handover of the RN 56 to the target radio base station 54-2, send a path switching message to the control-plane entity 70 supporting the relay-connected UE 58, to switch the user plane of the relay-connected UE 58 over to the target radio base station 54-2. Additionally, when multiple relay-connected UEs 58 are supported by the same control-plane entity 70, the anchor node 100 may send a group path-switching message for the multiple relay-connected UEs 58. This arrangement offers further signaling efficiency by consolidating the user-plane switchover for the case where the RN 56 has multiple relay-connected UEs 58 supported by the same control-plane entity 70.

Still further, in at least one embodiment of the anchor node 100, with respect to a subsequent handover of the RN 56 from the target radio base station 54-2 to a second target radio base station (not shown), the anchor node 100 is configured to act as a proxy for the control-plane entity 70 supporting the relay-connected UE 58, with respect to the second target radio base station. That is, the anchor node 100 continues to operate as a proxy for the core-network control-plane entity 70 that supports the relay-connected UE 58, even if the RN 16 undergoes one or more subsequent handovers.

Turning to FIG. 7, the illustrated logic flow diagram illustrates a processing method 700 implemented at the anchor node 100 for handing over a RN 56 from a source radio base station 54-1 to a target radio base station 54-2. The method 700 includes anchoring the anchor node 100 anchoring the control-plane connection of a relay-connected UE 58 before the handover with respect to the control plane entity 70 in the CN 68 that supports the relay-connected UE 58 and acting as a proxy for the control plane entity 70 towards the source radio base station 54-1, for control-plane signaling involving the relay-connected UE 58 (Block 702).

The method further includes the anchor node 100 receiving a handover request message from the source radio base station 54-1 and sending a corresponding handover request message to the target radio base station 54-2 (Block 704). The corresponding handover request message identifies the anchor node 100 rather than the control plane entity 70 as the supporting control plane entity of the relay-connected UE 58. In further handover operations, the anchor node 100 initiates switching of a user-plane connection of the relay-connected UE 58 from the source radio base station 54-1 to the target radio base station 54-2, while retaining the control-plane connection of the relay-connected UE 58 at the anchor node 100.

The method 700 thus continues with the anchor node 100 anchoring the control-plane connection of the relay-connected UE 58 after said handover with respect to the control plane entity 70 and acting as a proxy for the control plane entity 70 towards the target radio base station 54-2, for control-plane signaling involving the relay-connected UE 58. Put simply, from the perspective of the involved control plane entity 70 in the CN 68, the anchor node 100 anchors the UE's control-plane connection before the handover and continues anchoring that connection after the handover. Similarly, before handover, the anchor node plays the proxy role for the control plane entity 70 towards the source radio base station 54-1 and after handover it plays that role towards the target radio base station 54-2. Notably, the user-plane connection of the relay-connected UE 58 is switched over from the source radio base station 54-1 to the target radio base station 54-2. Further, apart from any anchor node functionality integrated into the source radio base station 54-1, the source radio base station 54-1 does not continue supporting control-plane signaling for the relay-connected UE 58 after handover. This arrangement provides for simplified RN handover—i.e., where the RAN-based control-plane connections of relay-connected UEs is unchanged by handover—and yet provides for efficient routing of signaling and data by moving the user-plane connections from source to target during each RN handover.

Figure 8:
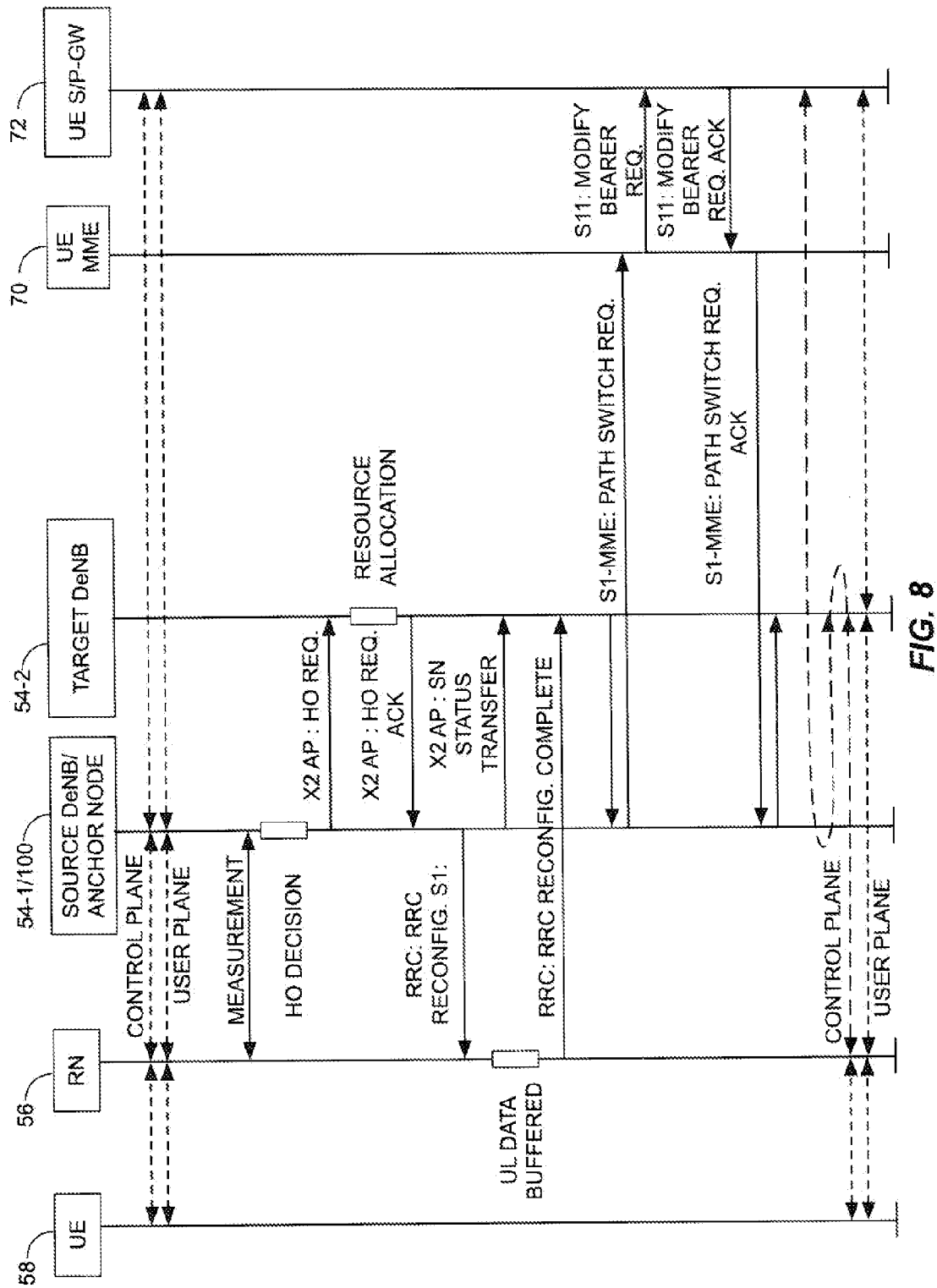
FIG. 8 is a signal flow diagram of one embodiment of signaling for mobile relay handover from a source radio base station to a target radio base station.

FIG. 8 illustrates an overall signaling flow for an example inter-base station handover, where the RN 56 moves from a source radio base station 54-1 to a target radio base station 54-2. While the overall signaling flow "matches" in some sense the conventional handover signaling flow known from LTE, it differs fundamentally with respect to the X2-AP signaling between the source and target radio base stations 54-1 and 54-2, which are labeled as source and target DeNBs in keeping with the LTE context.

According to the diagram, the handover decision is taken by the source DeNB 54-1 based on measurements. In response that decision, the source DeNB 54-1 sends a handover request message to the anchor node 100, e.g., via X2-AP signaling. The corresponding handover request message sent from the anchor node 100 to the target DeNB 54-2 identifies the anchor node 100 as the core-network control-plane entity supporting a relay-connected UE 58 involved in the handover. In an example, the control-plane connection for the relay-connected UE 58 is uniquely identified by an ID or other value at the supporting control-plane entity 70 and by a corresponding value at the anchor node 100. Rather than sending the value allocated by the control-plane entity 70, the anchor node 100 sends the corresponding value it has allocated to the connection, while maintaining the connection towards the control-plane entity 70.

Thus, after the handover, the control-plane connections of the UEs 58 supported by the RN 56 remain anchored at the anchor node 100. The control-plane signaling between the target DeNB and the CN 68 are still sent via the anchor node 100, so the RN "cell" has not moved in the control-plane sense from the perspective of the control plane entity 70 supporting the RN 56, and from the larger perspective of the CN 68. However the user-plane connections of the relay-connected UEs 58 are switched to the target DeNB 54-2. Thus, after handover, the user-plane data for the relay-connected UEs 58 is sent between the user-plane entity or entities 72 that support those connections and the target DeNB 54-2 directly. Consequently, the traffic load is optimized compared with any scheme that requires forwarding of the user-plane data from the source DeNB 54-1 and/or the anchor node 100.

In more detail, X2-AP signaling is exchanged between source and target DeNBs through the anchor node 100, to initiate the handover, including a Handover Request and Handover Request ACK messages. This messaging transfers E-RAB attributes and Radio Resource Control, "RRC", context for the relay-connected UEs 58. Other information is additionally exchanged, such as GTP configuration information, etc. Again, compared with conventional X2-AP handover signaling, the signaling here is modified—i.e., it has enhancements that provide for differentiated control- and user-plane handling. For example, because the handover involves the Un interface of the RN 56, the GTP TEID for the Un interface needs to be exchanged between the source and target DeNBs 54-1 and 54-2.

A conventional LTE handover request message includes, for example, an information element, "IE", that carries an address or other identifier that uniquely identifies the control-plane connection of a relay-connected UE 58, as maintained by the control-plane entity 70 in the CN 68 that supports that UE 58. This information element is referred to as the UE S1-MME ID. As part of sending a corresponding handover request message to the target DeNB 54-2 in response to receiving a handover request message from the source DeNB 54-1 identifying the target DeNB 54-2, the anchor node 100 substitutes the address or other identifier it has allocated for the control-plane connection of the relay-connected UE 58. That is, it sends its address to the target DeNB 54-2, rather than sending the address of the control-plane entity 70 in the CN 68 that actually supports the control plane of the relay-connected UE 58.

Further as part of the handover, the RRC connection of the RN 56 is re-configured to disconnect from the source DeNB 54-1 and then connect to target DeNB 54-2, e.g., via RRC-ConnectionReconfiguration and RRCConnectionReconfigurationComplete messages. Sequence Number, "SN", status transfer and data forwarding can be also included to achieve lossless handover—i.e., the UE context is transferred to the target DeNB 54-2. Further, a newly defined S1 signaling interface from the anchor node 100 to the RN 56 is used to re-configure the UL GTP TEID for the Un interface at the RN 56.

At completion of the handover of the RN 56, the user-plane connections of the relay-connected UEs 58 are switched from the source DeNB 54-1 to the target DeNB 54-2, e.g., via S1 signaling that includes a Path Switch Request message and a corresponding Path Switch Request ACK message, along with GTP-C signaling that includes a Modify Bearer Request and a Modify Bearer Request ACK. This signaling is generally consistent with conventional LTE handover signaling.

However, since control-plane signaling for the relay-connected UEs 58 remains anchored by the anchor node 100 after handover of the RN 56, the anchor node 100 acts as a S1-MME proxy towards the target DeNB 54-2, for the control plane entity 70—e.g., MME—actually supporting the relay-connected UE 58. In its proxy role, the anchor node 100 handles control-plane signaling involving the relay-connected UEs 58. Advantageously, from the perspective of the CN 68, the control-plane connection of the relay-connected UE 58 remains at the anchor node 100. Notably, the user-plane path switch signaling is performed by the anchor node 100 for each UE 58 connected to the RN 56. In the case that multiple UEs 58 are served by the same MME, the path switch message can optionally be sent in a more optimized way, e.g., not sending the path switch message one by one for the multiple relay-connected UEs 58, but rather in a grouped manner, to update the user-plane connections of multiple relay-connected UEs 58 at the same time. Grouping is done, for example, for the relay-connected UEs 58 that are supported by the same control plane entity 70.

The description immediately above effectively proposes a two-level proxy scheme where the anchor node 100 acts as an S1-MME proxy towards a given donor radio base station 54 that is supporting an RN 56, with respect to the relay-connected UEs 58 connected through that RN 56. At a second proxy level, the donor radio base station 54 acts as an S1-MME proxy for the RN 56. In contrast, for the user planes of the relay-connected UEs 58, there is only one level of proxy signaling, wherein the donor radio base station 54 forwards the user-plane data from the RN 56 to the one or more supporting user plane entities 72—e.g., S-GWs—in the CN 68. For both procedures, the proxy operations only change the involved addresses, e.g., S1-AP ID for the control-plane connections, and the GTP TEID for the user-plane connections.

Except for the RRC signaling used for RN re-configuration, all of the S1, X2, and S11 signaling can be EPS bearer-specific, so that a target radio base station 54-2 can accept or refuse the handover request in a UE-specific way. Alternatively, the handover can be made RN-specific, rather than bearer-specific, so that the handover of the RN 56, including all involved bearers, is accepted or rejected at the target radio base station 54-2. Despite a loss in flexibility, this approach offers further reductions in handover signaling as one of its advantages.

During the handover procedure, it is possible that the RN PCI conflicts with the neighboring cells 52 around the target radio base station 54-2. To avoid this conflict, one or more embodiments of the present invention include a PCI negotiation procedure as part of handover preparation. In one approach, a new PCI is configured for the RN 56, if a new PCI is needed to avoid a PCI conflict. The configuration is done via RRC signaling during execution of the handover. Thus, in at least one embodiment, the anchor node 100 is configured to support a Physical Cell ID, "PCI", negotiation procedure as part of supporting of the handover of an RN 56, in which a new PCI is configured for the RN (56) to avoid a PCI conflict.

For example, the anchor node 100 supports PCI renegotiation on an as-needed basis. In at least one such embodiment, the anchor node 100 is configured to detect PCI conflicts with respect to the handover target and the RN's current PCI, or to receive signaling indicating such a conflict. In response to such detection or receiving such signaling, the anchor node 100 initiates or otherwise provides signaling support for PCI renegotiation.

Figure 9:
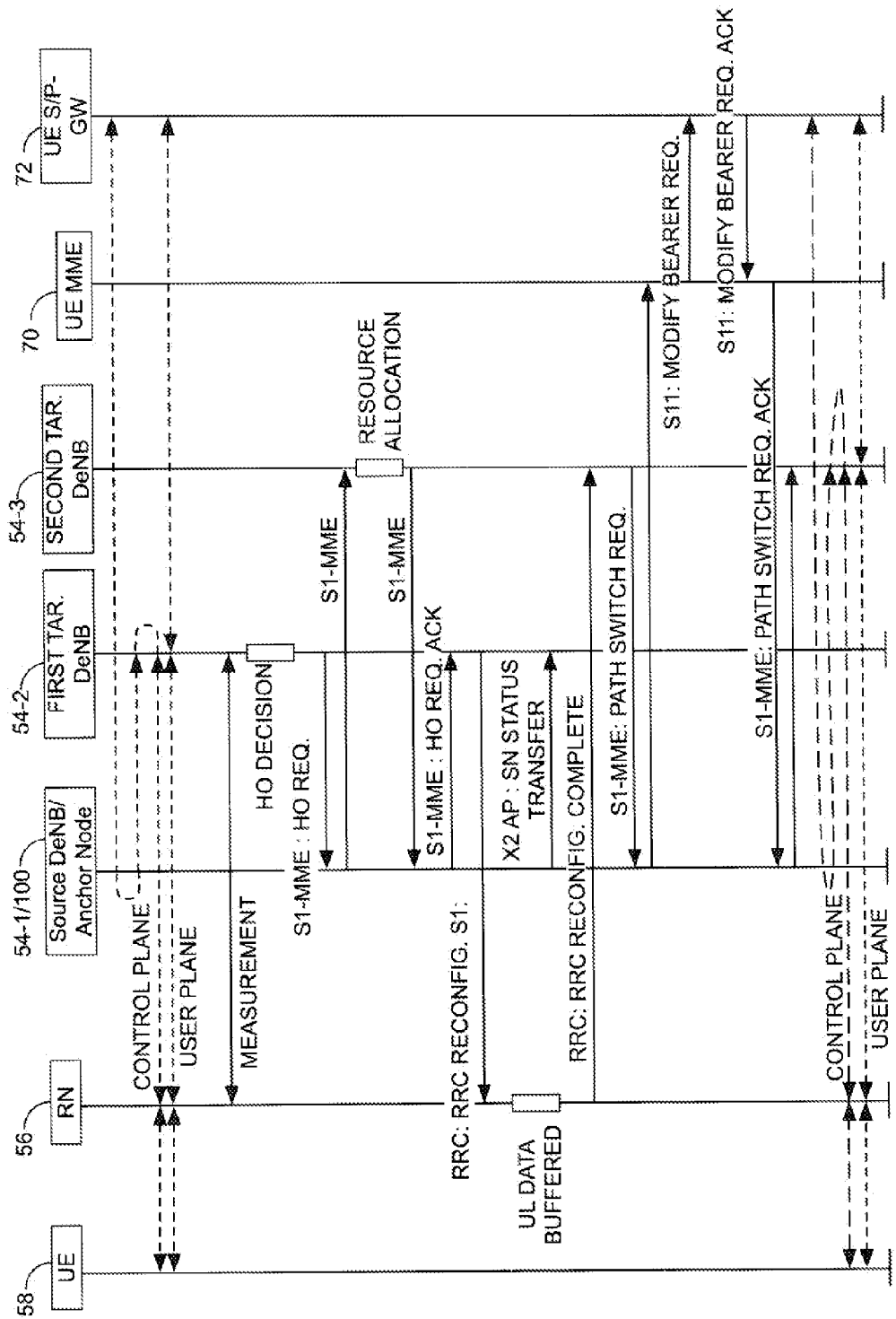
FIG. 9 is a signal flow diagram of one embodiment of signaling for a mobile relay handover occurring subsequent to the handover at issue in FIG. 8.

FIG. 9 illustrates an extension of the signaling flow introduced in FIG. 8, wherein one sees a handover of the RN 56 from a source DeNB 54-1 to a first target DeNB 54-2, and then a subsequent handover from that first target DeNB 54-2 to a second target DeNB 54-3. As will be seen, the control-plane connections of the relay-connected UEs 58 remain anchored at the anchor node 100 over both handovers. Moreover, as will be seen, the anchor node 100 operates as a control plane proxy for the control plane entity or entities 70 supporting the relay-connected UEs 58 first towards the source DeNB 54-1, then towards the first target DeNB 54-2, and then towards the second target DeNB 54-3. Advantageously, from the perspective of the supporting control plane entity or entities 70, the control-plane connections of the relay-connected UEs 58 remain anchored at the anchor node 100 across these two handovers.

With respect to the first target DeNB 54-2 performing a subsequent handover of the RN 56 to a second target DeNB 54-3, the second target DeNB 54-2 uses S1-based signaling to send the handover request to the anchor node 100, in keeping with the control-plane proxy role of the anchor node 100. In response to receiving the handover request message from the first target DeNB 54-2 over the S1-MME interface, the anchor node 100 uses that same interface to send S1-MME signaling to the second target DeNB 54-3. After handover the RN 56 from the first target DeNB 54-2 to the second target DeNB 54-3, the anchor node 100 continues to operate in its role as a proxy for the control-plane entity 70 supporting the relay-connected UE 58, with respect to the second target DeNB 54-3.

Among its numerous advantages, the present invention offers operation that is compatible with and can be directly integrated into the relay architecture agreed upon by the 3GPP. Further, the present invention avoids Packet Data Network Gateway, "PDN-GW", relocation during RN handover, i.e., the RN detaching and re-attaching operations are replaced by the modified handover operation disclosed herein. Moreover, the present invention's differentiated handling of the control- and user-plane connections of relay-connected UEs 58 during handover of the RN 56 provides for optimized handling of the associated user-plane traffic, thereby preventing that traffic from continuing to load a source radio base station 54-1 after handover to a target radio base station 54-2.

Still further, such as is shown in FIG. 9, the control-plane connections of the relay-connected UEs 58 remain anchored at the anchor node 100 over any number of downstream handovers of the RN 56. In this regard, it should be noted that the proxy role played by the anchor node 100 for control-plane signaling involving the relay-connected UEs 58 is transparent to other nodes in the network 60. If the anchor node 100 is integrated in or co-located with individual ones of the base stations 54, then the given one of those base stations 54 to which a given RN 56 initially attaches may serve as a continuing control-plane anchor over any number of subsequent handovers of the RN 56. The control-plane connections of the UEs 58 supported by the RN 56 would remain statically anchored at the anchor node function of the radio base station 54 to which the RN 56 initially attached.

Figure 10:
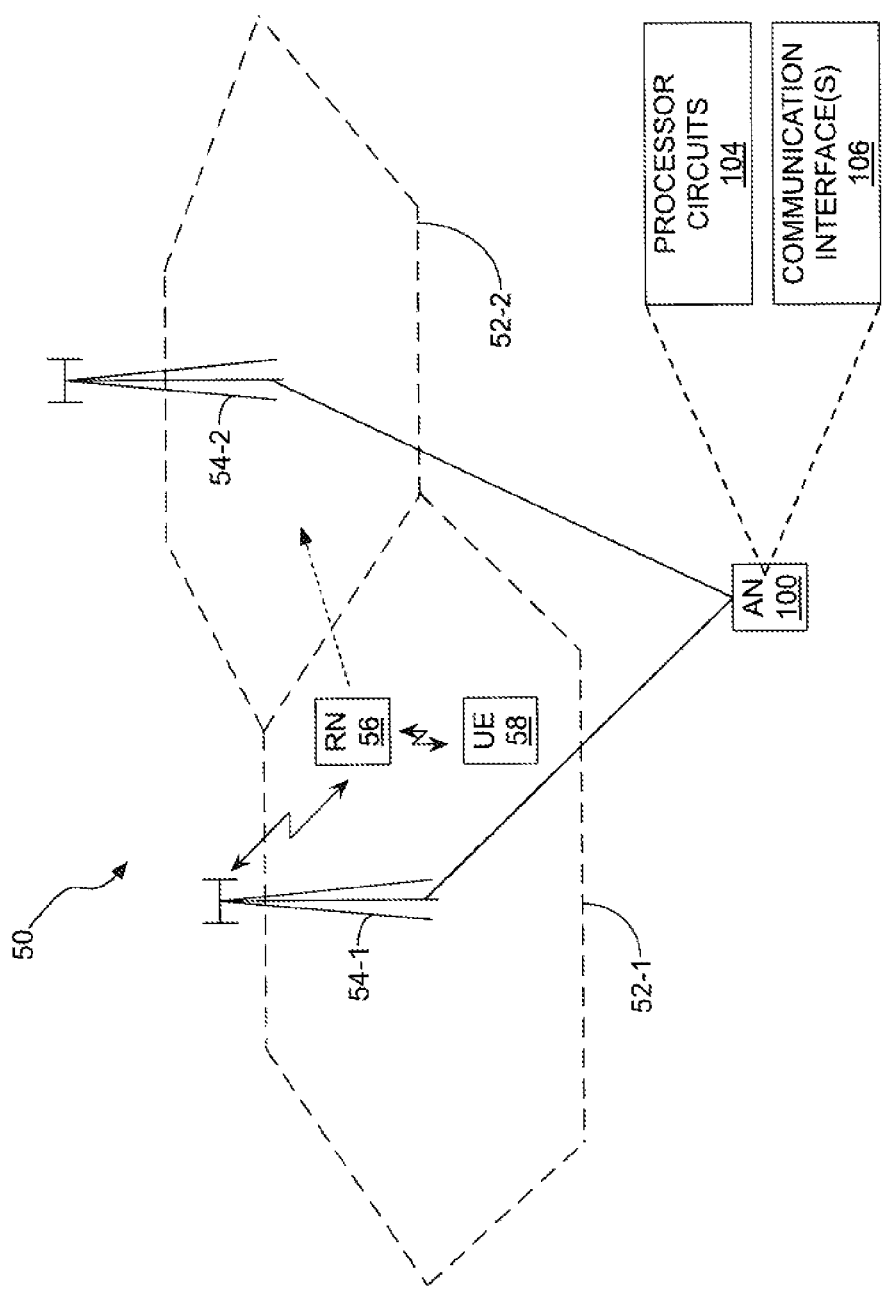
FIG. 10 is a block diagram of one embodiment wherein an anchor node is implemented in centralized fashion with respect to two or more radio base stations.

Equivalently, if the functionality of the anchor node 100 is broken out separately from the individual radio base stations 54, then one anchor node 100 can provide control-plane proxying functionality to multiple radio base stations 54. See FIG. 10, for example, which depicts an embodiment of control plane anchoring for relay-connected UEs 58 wherein an anchor node 100 provides control plane anchoring for relay-connected UEs 58 across multiple radio base stations 54. In at least one such embodiment, the anchor node 100 and the network 60 at large support initial attachment of mobile relay nodes 56 in a manner that provides for later differentiated handling of control and user plane connections for UEs 58 that are connected through a mobile relay node 56.

The anchor node 100 includes one or more processor circuits 104 and one or more cooperatively associated communication interfaces 106, which together are configured to support control-plane anchoring for the initial attachment of the relay node 56 with its relay-connected UEs 58, and its handover from the source radio base station 54-1 to the target radio base station 54-2. Such circuitry comprises, for example one or more computer-based circuits, such as one or more microprocessors, along with supporting program and data memory, input/output circuitry, etc.

In an example embodiment, the one or more processing circuits 104 configured to anchor the control-plane connection of a relay-connected UE 58 before handover with respect to a control plane entity 70 that supports the relay-connected UE 58 and to act as a proxy for the control plane entity 70 towards the source radio base station 54-1, for control-plane signaling involving the relay-connected UE 58. The one or more communication interfaces 106 are configured to receive a handover request message from the source radio base station 54-1 and send a corresponding handover request message to a target radio base station 54-2, where the corresponding handover request message identifies the anchor node 100 rather than the control plane entity 70 as the supporting control plane entity of the relay-connected UE 58.

Further, the one or more processing circuits 104 are configured to initiate switching of a user-plane connection of the relay-connected UE 58 from the source radio base station 54-1 to the target radio base station 54-2, while retaining the control-plane connection of the relay-connected UE 58 at the anchor node 100 and to continue anchoring the control-plane connection of the relay-connected UE 58 after handover with respect to the supporting control plane entity 70 in the CN 68. Further, the one or more processing circuits 104 are configured to continue acting as a proxy for the control plane entity 70, where such proxy operations are, after handover, performed towards the target radio base station 54-2, for control-plane signaling involving the relay-connected UE 58.

Figure 11:
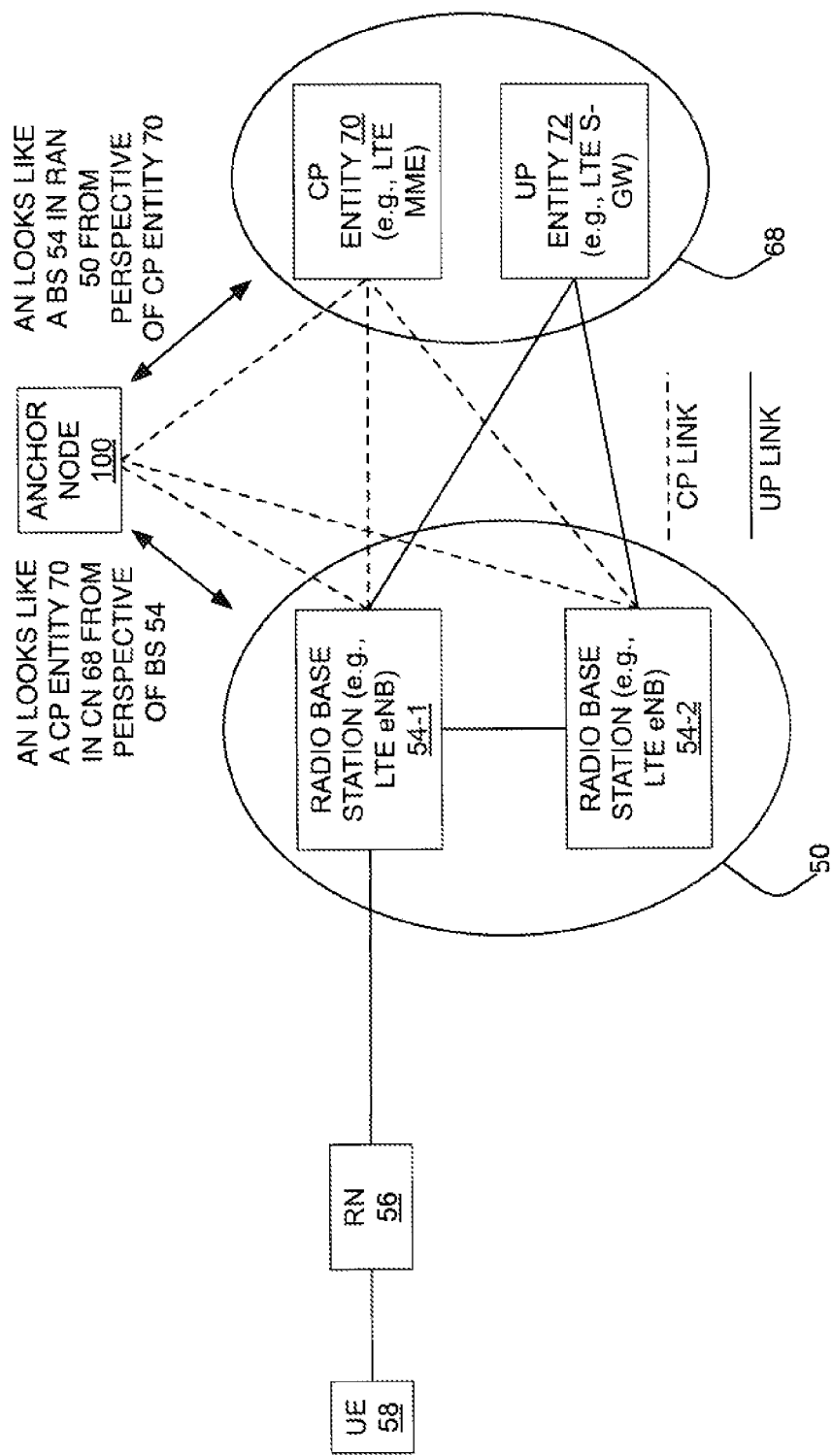
FIG. 11 is a block diagram of an embodiment of the anchor node implemented in centralized fashion, with additional details on the involved control-plane and user-plane connection links.

See FIG. 11, for example, for an illustration of the control and user plane links and connections associated with implementation of the anchor node 100. With the illustrated arrangement, the control-plane connections of the UEs 58 remain anchored by the anchor node 100 through any number of handovers of the relay node 56 to successive target radio base stations 54-3, 53-4, and so on.

Figure 12:
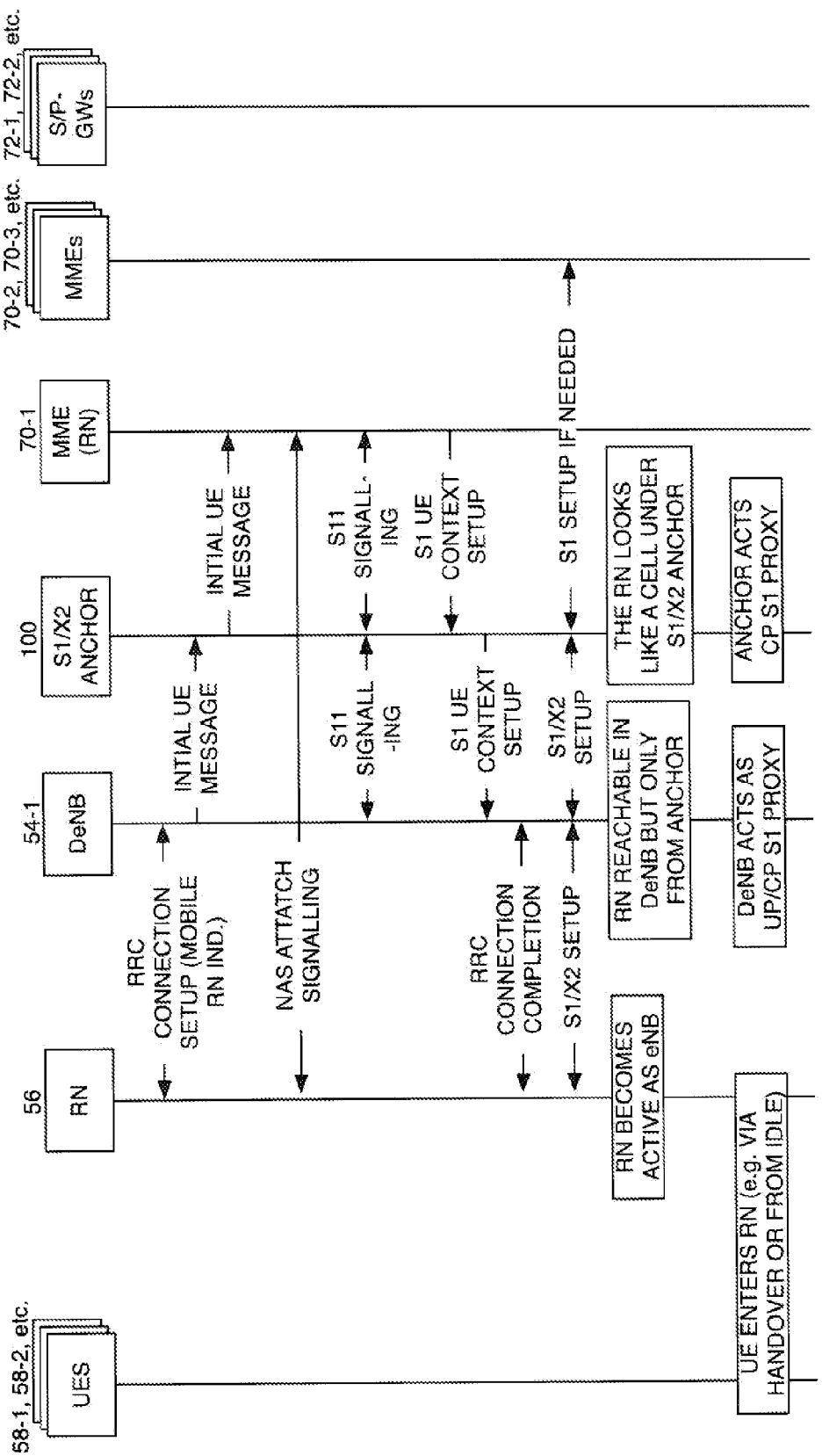
FIG. 12 is signal flow diagram of one embodiment of signaling for initial attachment of a mobile relay node to an anchor node.

As a further non-limiting example of anchor node operation, see the LTE-based signaling flow illustrated in FIG. 12, which provides a non-limiting example of an initial attachment procedure supported by the anchor node 100 for RNs 56 attaching to the network 60. A RN 56 initially attaches to the network 60 through a given donor radio base station 54 referred to here as the source DeNB 54-1. This attachment process involves RRC signaling between the RN 56 and the source DeNB 54-1 (RRC Setup). This procedure involves an initial UE message from the source DeNB 54-1 to the anchor node 100, acting as the S1/X2 anchor for the relay node's control plane signaling. In turn, the anchor node 100 sends corresponding initial UE messaging to the actual control plane entity 70-1 in the network 60 that will support the RN 56, referred to here as MME 70-1.

This messaging results in Non-Access Stratum (NAS) messaging between the MME 70-1, followed by S11 signaling between the MME 70-1, the anchor node 100, and the source DeNB 54-1. The MME 70-1 then sends an S1 UE context message, which is forwarded to the source DeNB 54-1 through the anchor node 100, and the source DeNB 54-1 correspondingly continues the initial relay attachment procedure by sending an RRC Connection Completion message to the RN 56. In response, RN 56 sends S1/X2 Setup messaging, which results in S1/X Setup signaling between the source DeNB 54-1 and the anchor node 100, and S1 Setup messaging between the anchor node 100 and the one or more control-plane entities, e.g., "MMEs", 70-2, 70-3, etc., supporting the relay-connected UEs 58-1, 58-2, and so on.

At this point, the RN 56 operates as a base station connecting the UEs 58-1, 58-2, and so on, to the network 60. In that regard, the relay node 56 is "reachable" in a control-plane signaling sense through the anchor node 100. In other words, the RN 56 looks like a cell under the anchor node 100, in terms of S1/X2 signaling. From the perspective of the relay-connected UEs 58, the source radio base station 54-1 acts as a UP/CP S1 proxy (first proxy layer) for the RN 56, and the anchor node 100 acts as a CP S1 proxy (second proxy layer) for the relay node 56 and its relay-connected UEs 58.

Figure 13:
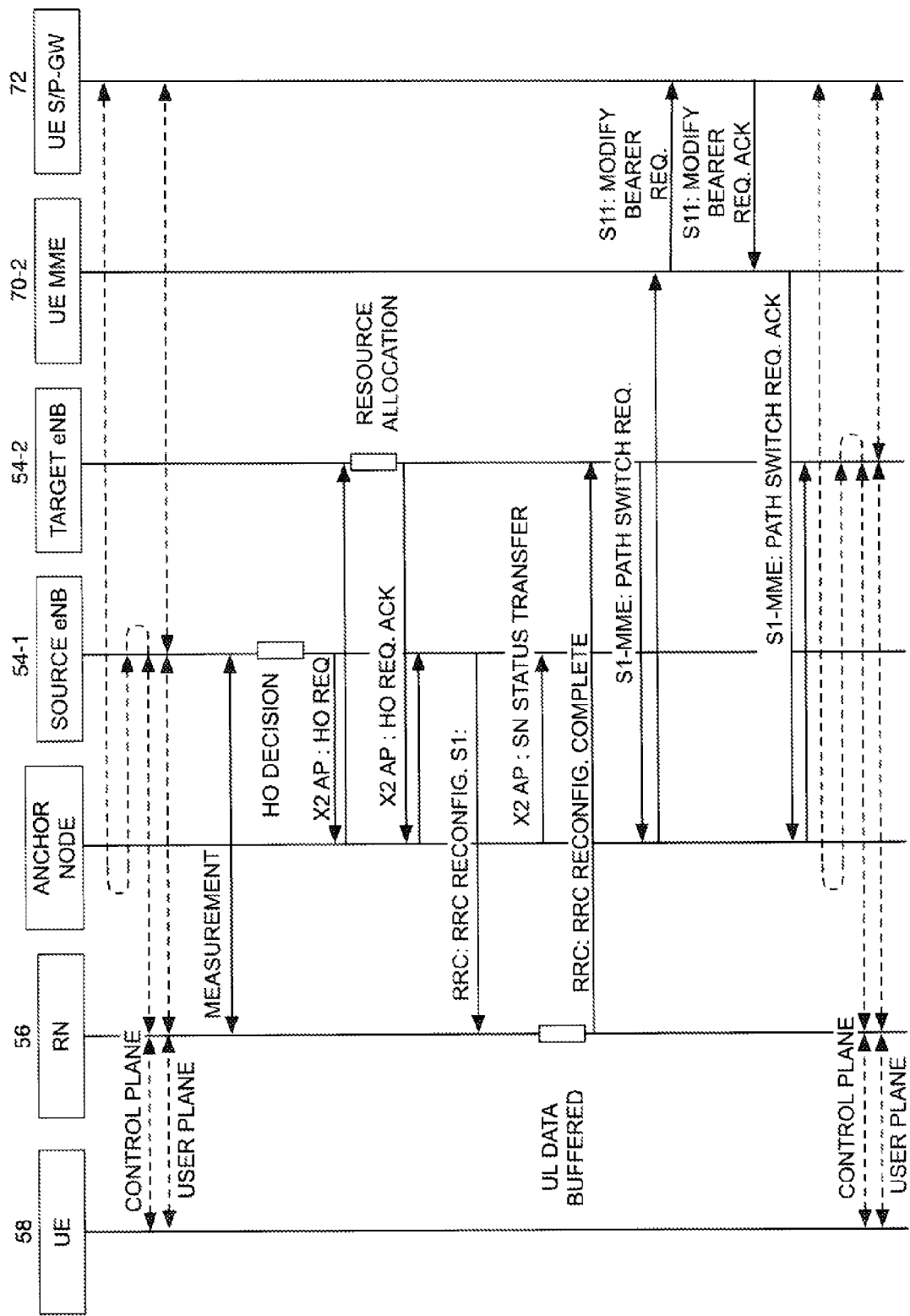
FIG. 13 is a signal flow diagram of one embodiment of signaling for a first handover from a source donor radio base station to a first target donor radio base station, where an anchor node supporting the handover is shown as a separate logical and/or physical entity within the network.

FIG. 13 provides further example signaling flow details and control-plane connection details, for the handover case where the relay node 56 is handed over from a source DeNB 54-1 to a target DeNB 54-2. One sees one level of user-plane proxy, wherein the user plane for a relay-connected UE 58 is connected (anchored) at the source radio base station 54-1, which acts a proxy for a user-plane entity 72, e.g., a S-GW, with respect to the RN 56. However, the control plane is proxied at two levels or layers, once at the source DeNB 54-1 and further at the anchor node 100—in this regard, the diagram depicts the control-plane connections as extending through the anchor node 100.

When the decision is made to handover the RN 56 from the source DeNB 54-1 to a target DeNB 54-2, the source DeNB 54-1 sends X2 AP signaling to the anchor node 100. In turn, the anchor node 100 forwards a corresponding X2 AP handover request message to the target DeNB 54-2, which then responds with a handover request acknowledgment that is forwarded to the source DeNB 54-1 by the anchor node 100.

The source DeNB 54-1 then initiates S1 reconfiguration via RRC signaling towards the relay node 56. One sees that the anchor node 100 supports this reconfiguration by initiating SN status transfer via X2 AP signaling toward the source DeNB 54-1. Also, note that the anchor node 100 supports path switching signaling (e.g., S1 MME path switching signaling) in its role as a proxy for the MMEs 70-2, etc., that support the relay-connected UEs 58.

Of course, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of supporting handover of a mobile Relay Node (RN) from a source radio base station to a target radio base station, the method performed by an anchor node and comprising:
    anchoring a control-plane connection of a relay-connected User Equipment (UE) before said handover with respect to a control plane entity that supports the relay-connected UE and acting as a proxy for the control plane entity towards the source radio base station, for control-plane signaling involving the relay-connected UE;
    receiving a handover request message from the source radio base station and sending a corresponding handover request message to the target radio base station, said corresponding handover request message identifying the anchor node rather than the control plane entity as the supporting control plane entity of the relay-connected UE, and initiating switching of a user-plane connection of the relay-connected UE from the source radio base station to the target radio base station, while retaining the control-plane connection of the relay-connected UE at the anchor node; and
    anchoring the control-plane connection of the relay-connected UE after said handover with respect to the control plane entity and acting as a proxy for the control plane entity towards the target radio base station, for control-plane signaling involving the relay-connected UE.

2. The method of claim 1, wherein the source radio base station is a source Donor eNB (DeNB) in a Long Term Evolution (LTE) Radio Access Network (RAN) the target radio base station is a target DeNB in the LTE RAN, and the control-plane entity is a Mobility Management Entity (MME) and wherein the method includes receiving the handover request message from the source DeNB and sending the corresponding handover request message to the target DeNB via X2 Application Protocol (AP) signaling.

3. The method of claim 2, wherein the anchor node acts as a proxy for the MME towards the source DeNB before handover and towards the target DeNB after handover, including forwarding S1 MME signaling sent from the MME for the relay-connected UE to the source or target DeNB, and forwarding S1 MME signaling sent from the source or target DeNB for the relay-connected UE to the MME.

4. The method of claim 2, wherein the control-plane identifier sent by the anchor node in the corresponding handover request message comprises a UE S1-MME ID as allocated at the anchor node, instead of the corresponding ID allocated at the MME.

5. The method of claim 1, wherein sending the corresponding handover request message includes sending a tunneling identifier for the RN to the target radio base station.

6. The method of claim 5, wherein sending the tunneling identifier for the RN comprises sending a Tunneling Endpoint Identifier (TEID) for the RN, in accordance with the GPRS Tunneling Protocol (GTP).

7. The method of claim 1, wherein said initiating switching of the user-plane connection of the relay-connected UE from the source radio base station to the target radio base station comprises sending a path-switching message from the anchor node to the control-plane entity, to switch the user plane of the relay-connected UE over to the target radio base station.

8. The method of claim 7, further comprising, when multiple relay-connected UEs are supported by the RN and share the same control-plane entity, sending a group path-switching message from the anchor node to switch over the user planes of the multiple relay-connected UEs.

9. The method of claim 1, further comprising, with respect to a subsequent handover of the RN from the target radio base station to a second target radio base station, said anchor node acting as a proxy for the control-plane entity towards the second target radio base station, for control-plane signaling involving the relay-connected UE.

10. The method of claim 1, wherein said method further includes supporting a Physical Cell ID (PCI) negotiation procedure as part of said supporting of said handover of said RN, in which a new PCI is configured for the RN to avoid a PCI conflict.

11. An anchor node configured to support handover of a mobile Relay Node (RN) from a source radio base station to a target radio base station, the anchor node comprising:
    one or more processing circuits configured to anchor a control-plane connection of a relay-connected User Equipment (UE) before said handover with respect to a control plane entity that supports the relay-connected UE and to act as a proxy for the control plane entity towards the source radio base station, for control-plane signaling involving the relay-connected UE; and
    one or more communication interfaces configured to receive a handover request message from the source radio base station and send a corresponding handover request message to the target radio base station, said corresponding handover request message identifying the anchor node rather than the control plane entity as the supporting control plane entity of the relay-connected UE;
    said one or more processing circuits further configured to:
        initiate switching of a user-plane connection of the relay-connected UE from the source radio base station to the target radio base station, while retaining the control-plane connection of the relay-connected UE at the anchor node; and
        anchor the control-plane connection of the relay-connected UE after said handover with respect to the control plane entity and act as a proxy for the control plane entity towards the target radio base station, for control-plane signaling involving the relay-connected UE.

12. The anchor node of claim 11, wherein the source radio base station is a source Donor eNB (DeNB) in a Long Term Evolution (LTE) Radio Access Network, (RAN) the target radio base station is a target DeNB in the LTE RAN, and the control-plane entity is a Mobility Management Entity (MME) and wherein the anchor node is configured to receive the handover request message from the source DeNB and send the corresponding handover request message to the target DeNB via X2 Application Protocol (AP) signaling.

13. The anchor node of claim 12, wherein said anchor node comprises part of said source DeNB.

14. The anchor node of claim 12, wherein the anchor node is configured to act as a proxy for the MME towards the source DeNB before handover and towards the target DeNB after handover, including being configured to forward S1 MME signaling sent from the MME for the relay-connected UE to the source or target DeNB, and to forward S1 MME signaling sent from the source or target DeNB for the relay-connected UE to the MME.

15. The anchor node of claim 12, wherein the control-plane identifier sent by the anchor node in the corresponding handover request message comprises a UE S1-MME ID as allocated at the anchor node, instead of the corresponding ID allocated at the MME.

16. The anchor node of claim 11, wherein the anchor node is configured to send a tunneling identifier for the RN to the target radio base station, as part of sending the corresponding handover request message to the target radio base station.

17. The anchor node of claim 16, wherein the anchor node is configured to send the tunneling identifier for the RN as a Tunneling Endpoint Identifier (TEID) for the RN, in accordance with the GPRS Tunneling Protocol (GTP).

18. The anchor node of claim 11, wherein the anchor node is configured to initiate said switching of the user-plane connection of the relay-connected UE from the source radio base station to the target radio base station based on being configured to send a path-switching message from the anchor node to the control-plane entity, to switch the user plane of the relay-connected UE over to the target radio base station.

19. The anchor node of claim 18, wherein the anchor node is configured to send, when multiple relay-connected UEs are supported by the RN and share the same control-plane entity, a group path-switching message from the anchor node to switch over the user planes of the multiple relay-connected UEs.

20. The anchor node of claim 11, wherein, with respect to a subsequent handover of the RN from the target radio base station to a second target radio base station, the anchor node is configured to act as a proxy for the control-plane entity towards the second target radio base station, for control-plane signaling involving the relay-connected UE.

21. The anchor node of claim 11, wherein said anchor node comprises part of said source radio base station.

22. The anchor node of claim 11, wherein said anchor node is configured to support a Physical Cell ID (PCI) negotiation procedure as part of said supporting of said handover, in which a new PCI is configured for the RN to avoid a PCI conflict.

* * * * *